United States Patent
Piwonka et al.

(10) Patent No.: US 8,284,803 B2
(45) Date of Patent: Oct. 9, 2012

(54) CROSS-SCOPE SYNCHRONIZATION OF DATA ITEM KNOWLEDGE AND CORRESPONDING METADATA

(75) Inventors: Philip Daniel Piwonka, Seattle, WA (US); Lev Novik, Bellevue, WA (US); Sudarshan Chitre, Redmond, WA (US); Gayathri Tambaram Kailasam, Chennai (IN)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 12/649,827

(22) Filed: Dec. 30, 2009

(65) Prior Publication Data

US 2011/0158260 A1   Jun. 30, 2011

(51) Int. Cl.
*H04J 3/06* (2006.01)
(52) U.S. Cl. .......................................... 370/503
(58) Field of Classification Search .................. 370/350, 370/503; 375/354–356; 707/609, 610, 620–623
See application file for complete search history.

(56) References Cited

U.S. PATENT DOCUMENTS

| | | | | |
|---|---|---|---|---|
| 5,968,131 | A | * | 10/1999 | Mendez et al. ............ 709/246 |
| 6,496,944 | B1 | | 12/2002 | Hsiao |
| 7,216,133 | B2 | | 5/2007 | Wu |
| 7,778,282 | B2 | * | 8/2010 | Lee et al. ............ 370/503 |
| 2005/0027755 | A1 | | 2/2005 | Shah |
| 2005/0125621 | A1 | | 6/2005 | Shah |
| 2008/0144669 | A1 | | 6/2008 | Lee |
| 2009/0077138 | A1 | | 3/2009 | Davis |
| 2009/0144343 | A1 | | 6/2009 | Holt |

OTHER PUBLICATIONS

Microsoft Corporation, Introduction to the Microsoft Sync Framework Runtime, 13 pages, Nov. 2007.*

"7 Change Management for Databases", Oracle® Enterprise Manager Concepts, 10g Release 5 (10.2.0.5), Published Date: 2009, http://download.oracle.com/docs/cd/B19306_01/em.102/b31949/change_management.htm, 25 pages.

Moe Khosravy, "Introducing the Microsoft Sync Framework: Next Generation Synchronization Framework", Retrieved Date: Nov. 9, 2009, http://www.code-magazine.com/articleprint.aspx?quickid=0712102&printmode=true, 5 pages.

* cited by examiner

Primary Examiner — Frank Duong

(57) ABSTRACT

The subject disclosure relates to cross scope synchronization among different sets of nodes that synchronize the same data item(s) according to different synchronization scopes. In one aspect, create and update versions are defined for a scope in which a data item was created and updated, respectively, and create and update versions are defined for a local node shared for different groups of nodes synchronizing according to the different synchronization scopes (e.g., a server node).

22 Claims, 18 Drawing Sheets

| | Create Scope Version 500 | Local Create Version 520 | Update Scope Version 510 | Local Update Version 530 |
|---|---|---|---|---|
| Data Item 550 | B4 | S5 | A10 | S15 |
| Data Item 552 | | | | |
| Data Item 554 | | | | |

Scope Create ID 560 (Sales = Country)

Scope Update ID 570 (Sales = State)

FIG. 5

CROSS-SCOPE SYNCHRONIZATION OF DATA ITEM KNOWLEDGE AND CORRESPONDING METADATA

TECHNICAL FIELD

The subject disclosure relates to synchronizing data items across different endpoints having different scopes of synchronization, and to corresponding maintaining and updating of metadata associated with the cross-scope synchronization.

BACKGROUND

The popularity of mobile computing and communications devices has created a corresponding wish for the ability to deliver and receive information whenever wanted by users. Put simply, users want ubiquitous access to information and applications from a variety of devices, wherever, whenever, and whatever the devices' capabilities, and in addition, users want to be able to access and update such information on the fly, and they want guarantees that the data is as correct and up to date as can be.

There are a variety of distributed data systems that attempt to have devices and objects share replicas of data with one another. For instance, music sharing systems may synchronize music between a PC, a Cell phone, a gaming console and an MP3 player. Email data may be synchronized among a work server, a client PC, and a portable email device. However, today, to the extent such devices synchronize a set of common information with each other, the synchronization takes place according to a static setup among the devices. However, when these devices become disconnected frequently or intermittently, i.e., when they are loosely coupled such that they may become disconnected from communicating with each other, e.g., when a cell phone is in a tunnel, or when the number of devices to be synchronized is dynamic, it becomes desirable to have a topology independent way for the devices to determine what changes each other device does not know when they re-connect to one another, or as they join the network.

Today, as shown in FIG. 1, there are various examples where a master node 100 synchronizes in a dedicated manner with a client node 110, such as when an email server synchronizes with an email client. Due to the dedicated synchronization between the two devices, the information 102 used to synchronize between the two devices can be tracked by the master node 100. Such information 102 can also optionally be tracked by client node 110 as well, however, when the connection between master node 100 and client node 110 becomes disconnected at times, or when the number of synchronizing devices can suddenly increase or decrease, tracking the necessary information of the common information that each device uses to synchronize across all of those devices becomes a difficult problem.

Current solutions often base their synchronization semantics solely on clocks or logical watermarks for a specific node (e.g., the email server), as opposed to any node. These systems can work well in cases of a single connecting node or master. However, they run into problems when the topology or pattern in which the nodes connect can change unpredictably.

Other systems build proprietary synchronization models for specific kinds of data objects, tracking an enormous amount of primitive metadata specific to the data format across the devices in order to handle the problem. For instance, to synchronize objects of a particular Word processing document format, a lot of overhead and complexity goes into representing a document and its fundamental primitives as they change over time, and representing that information efficiently to other devices wishing to synchronize according to a common set of Word processing documents. In addition to such systems being expensive and complex to build and non-extendible due to the custom data format upon which they are based, such systems are inherently unscalable due to large amounts of metadata that must be generated, analyzed and tracked.

In addition, such solutions apply only to the one specific domain, e.g., Word processing documents. When synchronization objects of all kinds are considered, e.g., pictures, videos, emails, documents, database stores, etc., one can see that implementing custom synchronization solutions based on each object type for tracking evolution of such objects across all devices in a multi-master environment is unworkable today. Accordingly, such solutions inextricably link synchronization semantics with the data semantics.

Thus, there is a need for node-independent synchronization knowledge when computers in a topology change the way they connect to each other or as the number of computers grows. For instance, with a media player, it might be desirable to synchronize among multiple computers and multiple websites. In most instances, most applications can only synchronize data between a few well-known endpoints (home PC and media player). As the device community evolves over time for a user of the media player application, however, the need for data synchronization flexibility for the music library utilized by the devices increases, thereby creating the need for a more robust system.

The need becomes even more complex when one considers differing scopes of synchronization of items among various devices. In this regard, a synchronization scope defines what items, if any, are synchronized for a given device and to what other devices. For instance, if an item is being synchronized across various devices and across various synchronization scopes among those devices, keeping track of changes to that item becomes a complex problem. While for any given application, as described above, logic can be hardwired to handle the problem of differing scopes, a simple, topology independent solution eludes the art. While devices within a first scope have a view into which other device within the first scope have made a given change, and therefore can appreciate what changes require making or not making unto itself, changes originating from a device of another set of devices according to another scope are not natively appreciated by the devices within the first scope without the introduction of massive amounts of metadata that grows unacceptably large over time and in proportion to the number of other devices and different synchronization scopes for those devices. Accordingly, a way to limit the proliferation of this metadata would be desirable.

The above-described deficiencies of today's synchronization systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Various embodiments for synchronizing among different sets of nodes that synchronize the same data item(s) according to different synchronization scopes are described herein that define create and update versions for a scope in which a data item was created and updated, respectively, and define create and update versions for a local node shared for different groups of nodes synchronizing according to the different synchronization scopes (e.g., a server node as a non-limiting example).

In an exemplary method, a set of objects are synchronized between a node of a plurality of nodes and other node(s) communicatively coupled via one or more networks, where at least two different synchronization scopes apply to at least two different nodes of the plurality of nodes. The method includes determining first versioning information for object(s) of the set of objects pertaining to a synchronization scope applicable to a set of nodes where the object(s) changed or were created, and determining second versioning information for the object(s) applicable to synchronization scope(s) of set(s) of nodes other than the synchronization scope, and synchronizing the object(s) of the set of objects between the node and the other node(s) including determining whether to base the synchronizing on the first versioning information or the second versioning information.

As another example, a method for defining metadata for synchronizing among a plurality of devices and according to different synchronization scopes for different sets of devices of the plurality of devices includes defining first versioning information for data of a first community of devices that changed the data under conditions of a first scope defined for the first community of devices, and defining second versioning information for the data for other devices of the plurality of devices that are outside the first community of devices. In this regard, synchronizing the data among at least two devices of the plurality of devices is then based on the first versioning information or the second versioning information dependent on a present scope of synchronization applying to the at least two devices.

In another embodiment described in more detail below, a node connectable to a plurality of nodes via one or more networks and configured to synchronize a set of data items between the node and other node(s) of the plurality of nodes includes a synchronization component configured to synchronize the set of data items between the node and the other node(s) and configured to synchronize data item(s) of the set of data items according to at least two different synchronization scopes applying to at least two different groups of nodes of the plurality of nodes and encompassing the data item(s) within respective scopes.

The synchronization component can include a synchronization communications component configured to initiate synchronization with the other node(s) via a synchronization protocol that defines, independent of data type, metadata structure for a knowledge exchange between the other node(s) and the node, configured to transmit to the other node(s) a request to synchronize with the data item(s) within scope for the other node(s) based on the synchronization protocol and configured to receive external knowledge of the data item(s) within the scope for the other node(s) and corresponding versioning information from the other node(s), wherein the metadata structure for the knowledge exchange includes versioning information for the scope for the other node(s) and versioning information for nodes outside the scope.

The synchronization component can further include a synchronization analysis component configured to update local knowledge of the data item(s) represented on the node and corresponding node versioning information by comparing the external knowledge of the data item(s) and the corresponding versioning information from the other node(s) with the local knowledge of the data item(s) and the corresponding node versioning information to determine what changes to reflect in revised local knowledge of the data item(s) and the corresponding node versioning information.

These and other embodiments are described in more detail below.

BRIEF DESCRIPTION OF THE DRAWINGS

Various non-limiting embodiments are further described with reference to the accompanying drawings in which:

FIG. 5 is a block diagram illustrating exemplary non-limiting metadata for data items synchronized according to different scopes in an embodiment;

DETAILED DESCRIPTION

Overview

Figure 1:
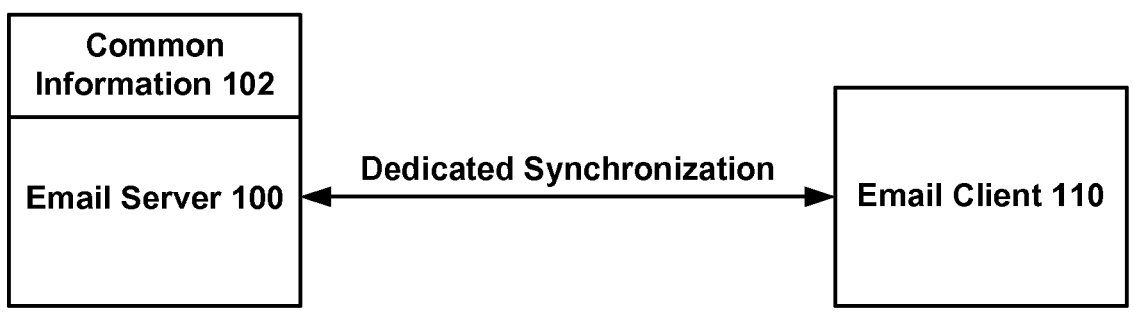
FIG. 1 illustrates a dedicated synchronization system that provides synchronization between two well defined endpoints of the system.

A synchronization framework, as described herein in one or more embodiments, defines a protocol for synchronizing data items across a collection of endpoints. Each unit of synchronization, called a 'scope', specifies the data that is to be synchronized among the collection of endpoints. Endpoints interested in a particular set of data are added to the 'scope' that contains that data. Endpoints within a scope synchronize the same set of data amongst themselves, which is achieved by maintaining version information about the data being synchronized.

In this regard, it is not only possible, but also a quite frequent scenario where multiple scopes are maintained, for scopes to be overlapping, meaning data on an endpoint can belong to more than one scope. For example, one scope could contain all data where State='WA' and another scope could be all the data where State='WA' OR 'CA', or 'USA'. In this case, a change to the data received in one scope can be propagated to other scopes that contain this data as well. For instance, in the foregoing examples, any change to a data item contained in the State='WA' scope can be propagated with respect to the other, broader scopes encompassing State='WA' as well.

As discussed in the background, among other things, conventional systems that handle synchronization of the same data items existing in disparate synchronization scopes, with no native understanding of one another's data, are typically hardwired to handle different changes, or they may track different versions for each item for every scope that exists, and for all changes. In addition to storing voluminous amounts of data as the data aggregates over time, processing overhead is unacceptable due to the amount of metadata that must be resolved across different scopes for different versions of the same data items.

In this regard, versioning of items can thus become expensive as items that live in multiple scopes must each have a version for every scope in which they live, which leads to performance and storage issues as the number of scopes an item lives in grows. The various embodiments described herein in the subject disclosure thus present a simple and efficient way of addressing this problem.

Accordingly, in various non-limiting embodiments, synchronizing among different sets of nodes that synchronize the same data item(s) according to different synchronization scopes is achieved by defining create and update versions for a scope in which a data item was created and updated, respectively, and defining create and update versions for a local node shared for different groups of nodes synchronizing according to the different synchronization scopes (e.g., a server node as a non-limiting example).

This metadata enables a simple representation of a version for the community of devices that know about a change made to a data item being synchronized as well as a simple representation of a version for the community of devices that do not know about the change made to the data item, vis-à-vis a proxy version understood by a common endpoint to the different synchronization scopes of the communities of devices.

Herein, an overview of some of the embodiments for achieving cross-scope synchronization of loosely coupled devices has been presented above. As a roadmap for what follows next, various exemplary, non-limiting embodiments and features are described in more detail with respect to representing efficient metadata under cross-scope circumstances for synchronizing data items independent of device topology within a given scope, and synchronizing according to the metadata. Then, some supplemental context is given for a general mechanism for efficiently representing knowledge in multi-master data synchronization systems, followed by representative network and computing environments in which such embodiments can be implemented.

Cross-Scope Synchronization of Data Item Knowledge

As mentioned, in various non-limiting embodiments, synchronizing among different sets of nodes that synchronize the same data item(s) according to different synchronization scopes is achieved by defining create and update versions for a scope in which a data item was created and updated, respectively, and defining create and update versions for a local node shared for different groups of nodes synchronizing according to the different synchronization scopes (e.g., a server node as a non-limiting example).

Instead of storing explicit versions for each item in each scope, the versions for scopes can be represented using two sets of versions, instead of as many versions as there are scopes. In this regard, on an endpoint that participates in multiple scopes where there is overlap at the item level, the endpoint can represent the item using: 1) the scope version of the item in which it was created and most recently modified and 2) the local version of the item on the endpoint that participates in multiple scopes.

This beneficially enables the ability to store only two sets of versions to represent an item that lives in or is synchronized with respect to any number of scopes. These versions are then interpreted during synchronization relative to a present synchronization scope and then altered to represent the item correctly for scopes after synchronizing the item. Based on the synchronization scope(s) assigned to an endpoint, the endpoint can be automatically configured based on a set of application independent interfaces to represent and track this metadata properly. In another aspect, after a database restore, the metadata may be repaired in order to allow synchronization to continue, e.g., by making the metadata consistent with the time of restoration.

In this regard, to synchronize an item, two versions are typically tracked for an item: a CREATE version and an UPDATE version, obviating the need to track every version of the data as part of the metadata. For an endpoint that contains data that lives in multiple scopes, in accordance with various embodiments described herein, two sets of CREATE/UPDATE versions are thus stored for each item, as follows:

CREATE version for the scope in which the item was created
UPDATE version for the scope in which the item was most recently updated
CREATE version for the local endpoint
UPDATE version for the local endpoint The first set are SCOPE versions that apply only to the scope in which the item was either created or updated. The second set are LOCAL versions that are the versions for the item on the local endpoint itself (e.g., a node such as a server node that is shared among different synchronizing scopes).

In one implementation, a version contains a replica ID as well as a tickcount to determine which endpoint operated on the item (using the replica ID) and when this occurred (using the tickcount). For each scope, the local endpoint that participates in multiple scopes has a unique replica ID for each scope.

In addition to the versions, to which scope the scope versions apply is also tracked, which can be referred to as the SCOPE UPDATE ID and SCOPE CREATE ID. Using this information, in one non-limiting implementation, the version of an item can be determined based on the following criteria:

If the SCOPE UPDATE ID is "NONE", then this is a local change and the LOCAL UPDATE version is used along with the local replica ID for the scope being synchronized.

If the scope under which synchronization is occurring is not equal to the SCOPE UPDATE ID, then the LOCAL UPDATE version is used for the update version of the item using the local replica ID for the scope. This means that for scopes that did not originate the change, the change will look like a local change. The term local here is used to imply that the change will appear to a node of a scope that did not make the change as if it is coming from a node of the scope through which the change travels or from where the changes are sourced, e.g., the node that is presenting the change within the given scope. For instance, where a server (or other common node) is common to different scopes, the server is the "local" entity that makes changes originating from different scopes appear to have originated within the server. In this sense, to devices not within the scope under which the change occurred, a substitute or proxy version is used as if the change came from a node that is commonly shared across scopes.

If the scope under which synchronization is occurring is equal to the SCOPE UPDATE ID, then the SCOPE UPDATE version is used for the update version of the item. In other words, when the devices have knowledge of the node that made the update, the local knowledge within scope can be used.

The above description applies to UPDATE versions, however a similar logic applies to determining CREATE versions as well.

If the SCOPE CREATE ID is "NONE", then this is a local create and the LOCAL CREATE version is used along with the local replica ID for the scope being synchronized.

If the scope under which synchronization is occurring is not equal to the SCOPE CREATE ID, then the LOCAL CREATE version is used for the create version of the item using the local replica ID for the scope. This means that for scopes that did not create the item, the change will nonetheless look like a local create. Again the term local is used to imply that the create will appear to a node of a scope that did not create the item as if it is coming from a node of within that scope from where the creation is sourced, e.g., the node that is presenting the created item within the given scope. For instance, where a server (or other common node) is common to different scopes, the server is the "local" entity that presents items created from different scopes making them appear to have originated locally within the server. In this sense, to devices not within the scope under which the item was created, a substitute or proxy version is used as if the create came from a node that is commonly shared across scopes.

If the scope under which synchronization is occurring is equal to the SCOPE CREATE ID, then the SCOPE CREATE version is used for the create version of the item. In other words, when the devices have knowledge of the node that created the item, the local knowledge within scope can be used.

This determination of versions is used to calculate changes that are sent to other endpoints in the scope, as well as to detect conflicts and determine the state of a row, as stored.

In one embodiment, when an endpoint makes a local change, the SCOPE UPDATE ID is set to "NONE" to reflect the fact that this change was made locally (e.g., by a shared node such as the server) and can be sent to scopes in which this item lives. In such case, the LOCAL UPDATE version is used because the change is actually made by the shared endpoint, and thus appearances need not be maintained that updates may have originated elsewhere.

When an endpoint that lives in multiple scopes receives a change through synchronization, it records both its own local version and scope version for that item. If a conflict resolution occurs on an item, then the change is altered to look like a local change in accordance with the rules applied according to the overall synchronization framework deployed. This enables conflict resolution to be synchronized with scopes in which that item lives.

Figure 2:
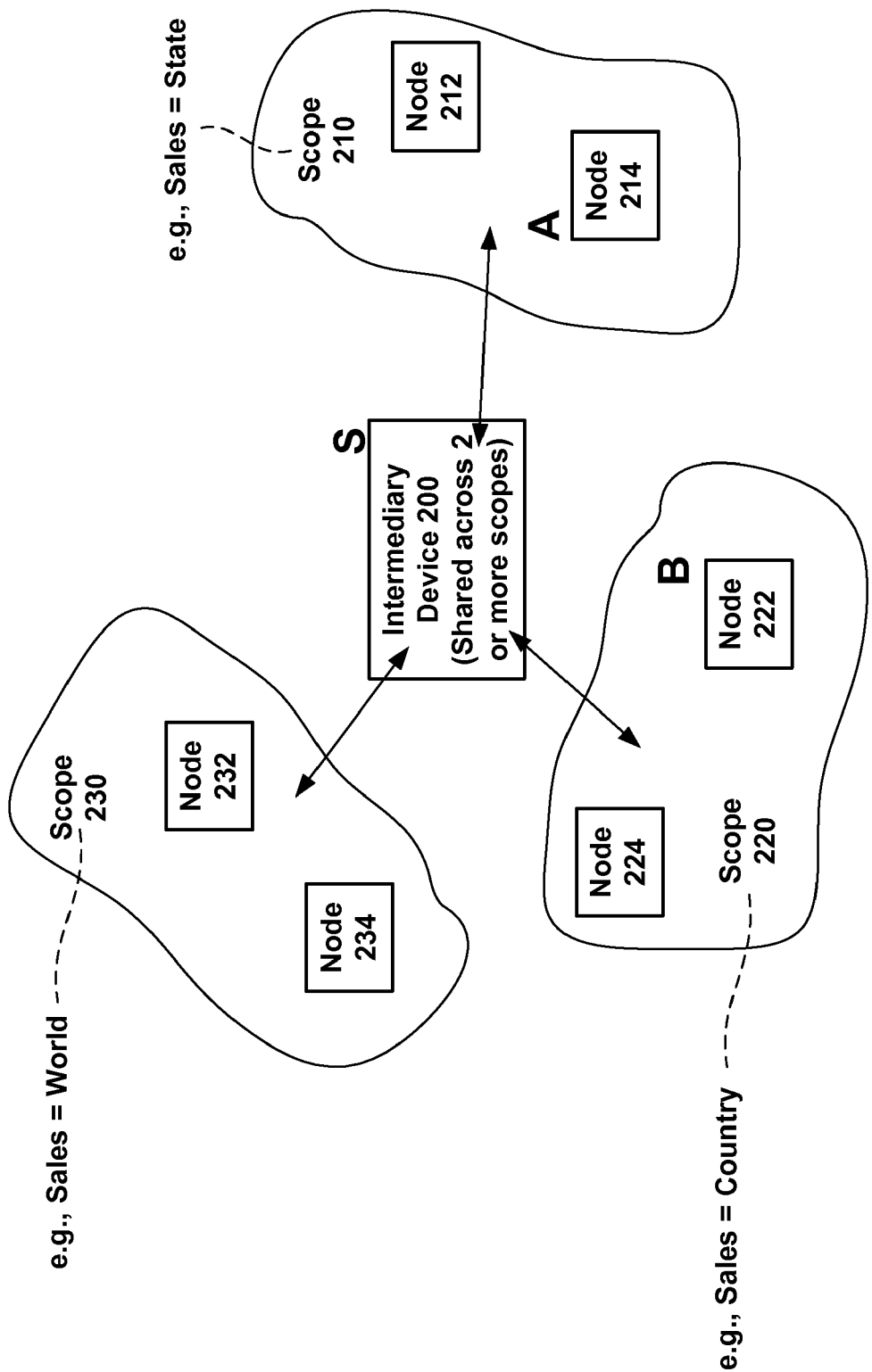
FIG. 2 is a block diagram illustrating a non-limiting representative scenario in which different nodes of an overall group of nodes synchronize a subset of data items according to different synchronization scopes.

FIG. 2 is a block diagram illustrating a non-limiting representative scenario in which different nodes of an overall group of nodes synchronize a subset of data items according to different synchronization scopes. As shown in FIG. 2, a typical set of nodes may include an intermediary device 200, which is shared across two or more synchronizing scopes 210, 220, 230. For instance scope 210 may includes a set of nodes 200, 212 and 214 for which the synchronization scope is Sales data=a specific state such as "Washington State". Thus, these nodes synchronize data items applicable to that specific state. As another example, another set of nodes 200, 222 and 224 may synchronize data for which the synchronization scope is Sales data=Country such as "USA". For another example, another set of nodes 200, 232 and 234 may synchronize data for which the synchronization scope is Sales data=World, i.e., including all countries. For the sake of this example, node 214 has a replica ID of A, node 222 has a replica ID of B and node 200 has a replica ID of S.

Figure 3:
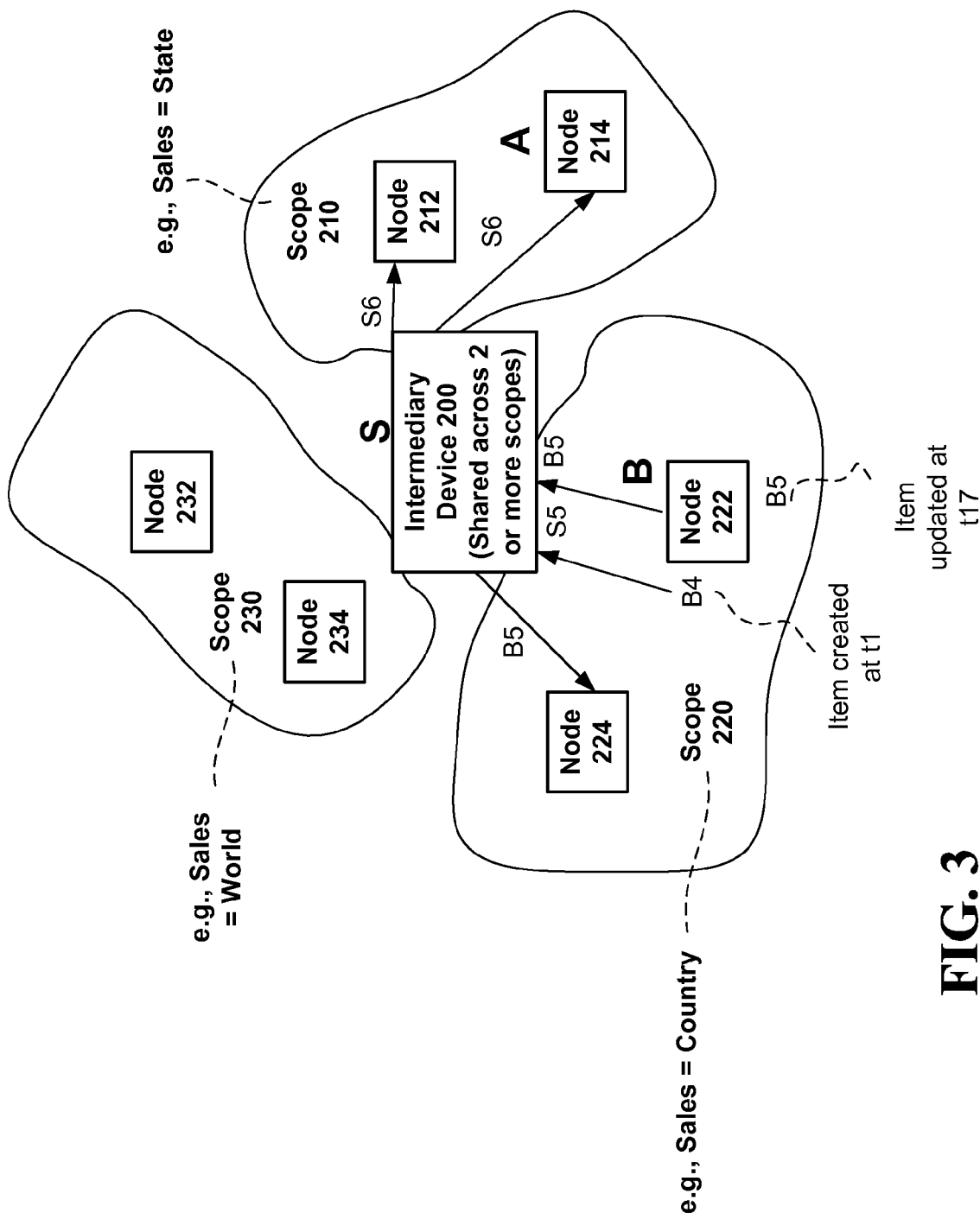
FIG. 3 is a block diagram illustrating a first example where an item is updated in the scope in which it was created, and illustrating a subsequent synchronization as a result.

Based on the setup of FIG. 2, FIG. 3 is a block diagram illustrating a first example where an item is updated in the scope in which it was created, and illustrating a subsequent synchronization as a result. As mentioned, node 200 is shared across the different scopes 210, 220 and 230. In this example, to illustrate the way metadata is synchronized according to the two different sets of versions for each data item, at time=t1, an item is created by node 222 in scope 220. With replica ID=B, the item is assigned version B4 at the time of creation. In accordance with the various embodiments described herein, the item is also assigned a local version on device 200. With replica ID=S, the local version may be S5, for example. Next, after time passes, the item may be updated at time=t17. Accordingly, depending on which node is synchronizing under what scope, a different version will be propagated. If node 224 is synchronizing, since node 224 has an understanding within scope 220 of node 222, the system ensures that node 224 receives the updated version within the scope in which the update occurred, which in this example is B5. However, if either of nodes 212 or 214 are synchronizing, since neither node 212 nor node 214 understands the meaning of B5 as being out of scope, the local version (as updated from S5 to S6) is used instead of B5, and sent to nodes 212 and 214. In this respect, from the perspective of nodes 212 and 214, it appears as if the update occurred at node 200. Similar updating would occur if the nodes 232 and 234 of scope 230 were synchronizing, i.e., they also would receive the update as S6.

Figure 4:
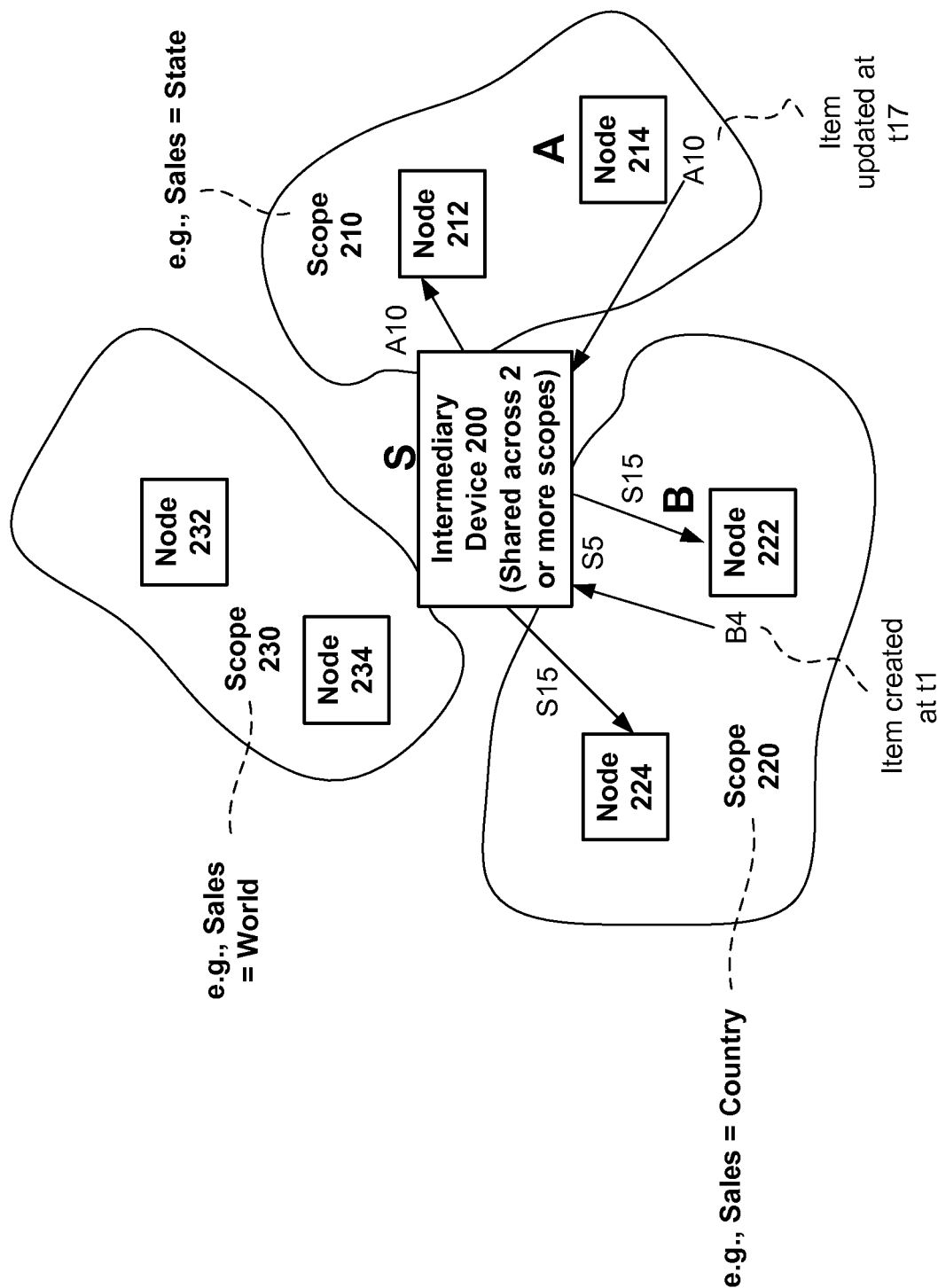
FIG. 4 is a block diagram illustrating a second example where an item is updated in a different scope than the scope in which it was created, and illustrating a subsequent synchronization as a result.

FIG. 4 is a block diagram illustrating a second example where an item is updated in a different scope than the scope in which it was created, and illustrating a subsequent synchronization as a result. Similar to FIG. 3, the item is created at t1 as B4 with local version on device 200 represented as S5. Then, time passes and at time=t17, the item is updated by node 214 as represented by update A10. In this regard, since node 212 is within scope with the updating node 214, node 212 also receives the update as A10. From the perspective of node 222 and node 224, which do not have an understanding of node 214 within scope 210, however, A10 does not have applicable meaning, and thus the local version update of S15 is used instead (assuming S5 had evolved to S14 prior to the update).

One additional case that is not shown is the case where device 200 itself creates the item or makes the item. In such case, in one embodiment, the scope ID for the create or update versions of the metadata is represented as none, null, or other signifier, indicating that the create or update version applies to all applicable scopes, and can thus be used in synchronizing with such scopes.

FIG. 5 is a block diagram illustrating exemplary non-limiting metadata for data items synchronized according to different scopes in an embodiment. As mentioned, per data item is represented for each data item having create/update versions both for the scope in which the item was created or updated and also corresponding versions, e.g., proxy versions, for the create or update as if originating locally by a device common to multiple scopes. For instance, in the example of FIG. 4, a data item, e.g., data item 550, was created with a create scope version 500 of B4 corresponding to a local create version 520 of S5. The scope create ID 560 for these is scope 220 (Sales=country). Data item 550 also was updated according to scope update ID 560 (Sales=State), and has update scope version 510 with counterpart local update version 530 of S15. As mentioned, this metadata is tracked for each data item 552, 554, etc. This metadata is then used whenever a synchronization operation takes place to resolve the cross-scope issues that may result from different nodes synchronizing according to different scopes.

Figure 6:
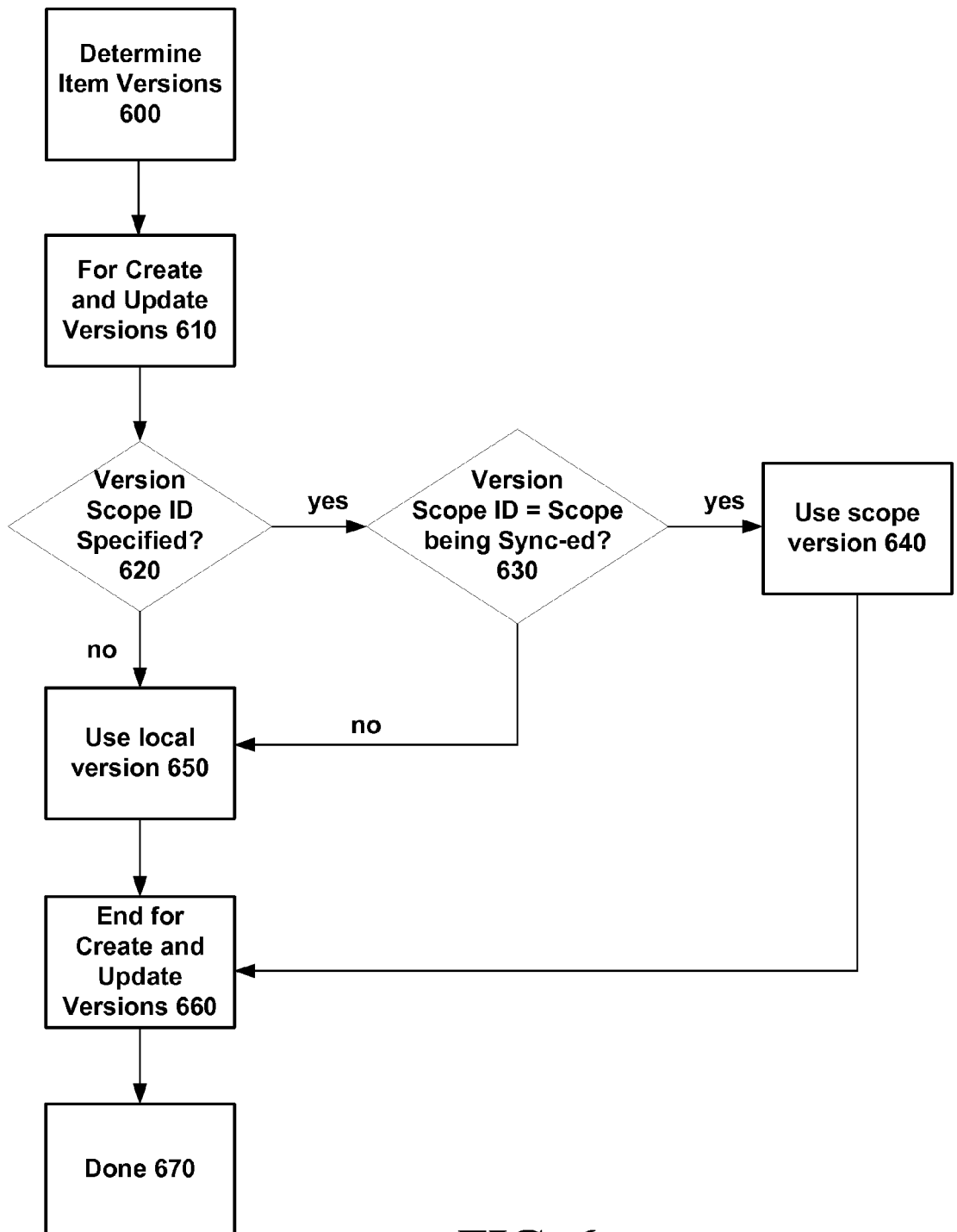
FIG. 6 is a flow diagram illustrating an exemplary non-limiting process for determining what metadata to use when synchronizing data items synchronized according to different synchronization scopes.

FIG. 6 is a flow diagram illustrating an exemplary non-limiting process for determining what metadata to use when synchronizing data items synchronized according to different synchronization scopes. The process is applicable to both resolution of create and update versions. In this regard, at 600, the item versions are determined from the metadata. Then, for the create versions or update versions as shown at 610, it is determined whether the version scope ID is specified at 620. This test informs whether the item was created (or updated) on the shared node, e.g., server, in which case the local version of the shared node will be used at 650. If the item was not created (or updated) on the shared node, then it is determined at 630 whether the version scope ID of the version is the same as the scope for the current synchronization. If so, then the create (or update) version can be used at 640 for the scope in which the item was created (or updated). If the version scope ID of the version is not the same as the scope for the current synchronization, then the local version of the shared node will be used at 650. For a larger synchronization, this process can be used for each data item as represented by 660, and when the larger synchronization finished, the process completes at 670.

Figure 7:
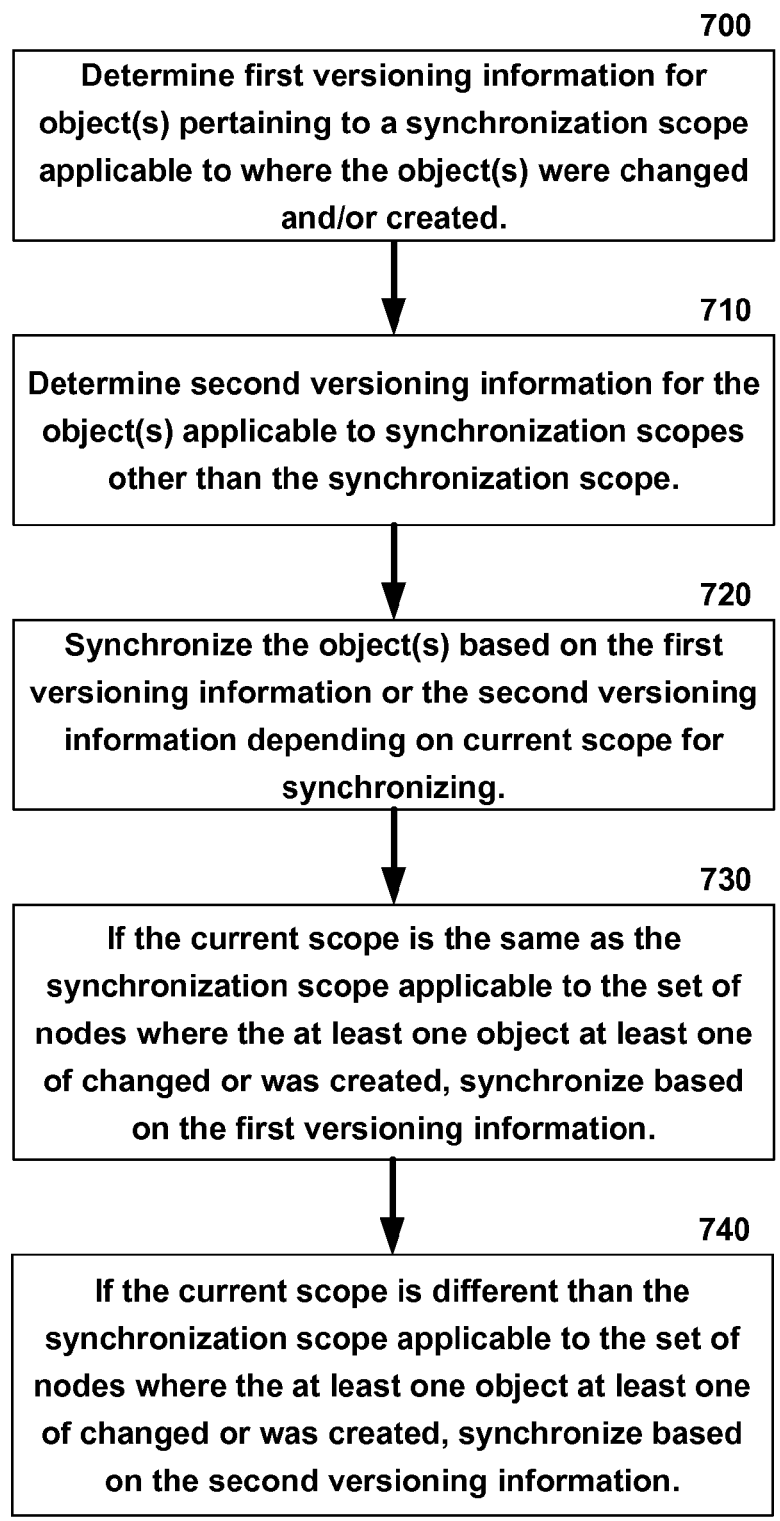
FIG. 7 is a flow diagram illustrating another exemplary non-limiting process for synchronizing data items according to different scopes.

FIG. 7 is a flow diagram illustrating another exemplary non-limiting process for synchronizing data items according to different scopes. At 700, first versioning information is determined for object(s) pertaining to a synchronization scope applicable to where the object(s) were changed and/or created. At 710, second versioning information is determined for the object(s) applicable to synchronization scopes other than the synchronization scope. At 720, the object(s) are synchronized based on the first versioning information or the second versioning information depending on current scope for synchronizing.

At 730, if the current scope is the same as the synchronization scope applicable to the set of nodes where the at least one object at least one of changed or was created, synchronization takes place based on the first versioning information.

At 740, if the current scope is different than the synchronization scope applicable to the set of nodes where the at least one object at least one of changed or was created, synchronization takes place based on the second versioning information.

Figure 8:
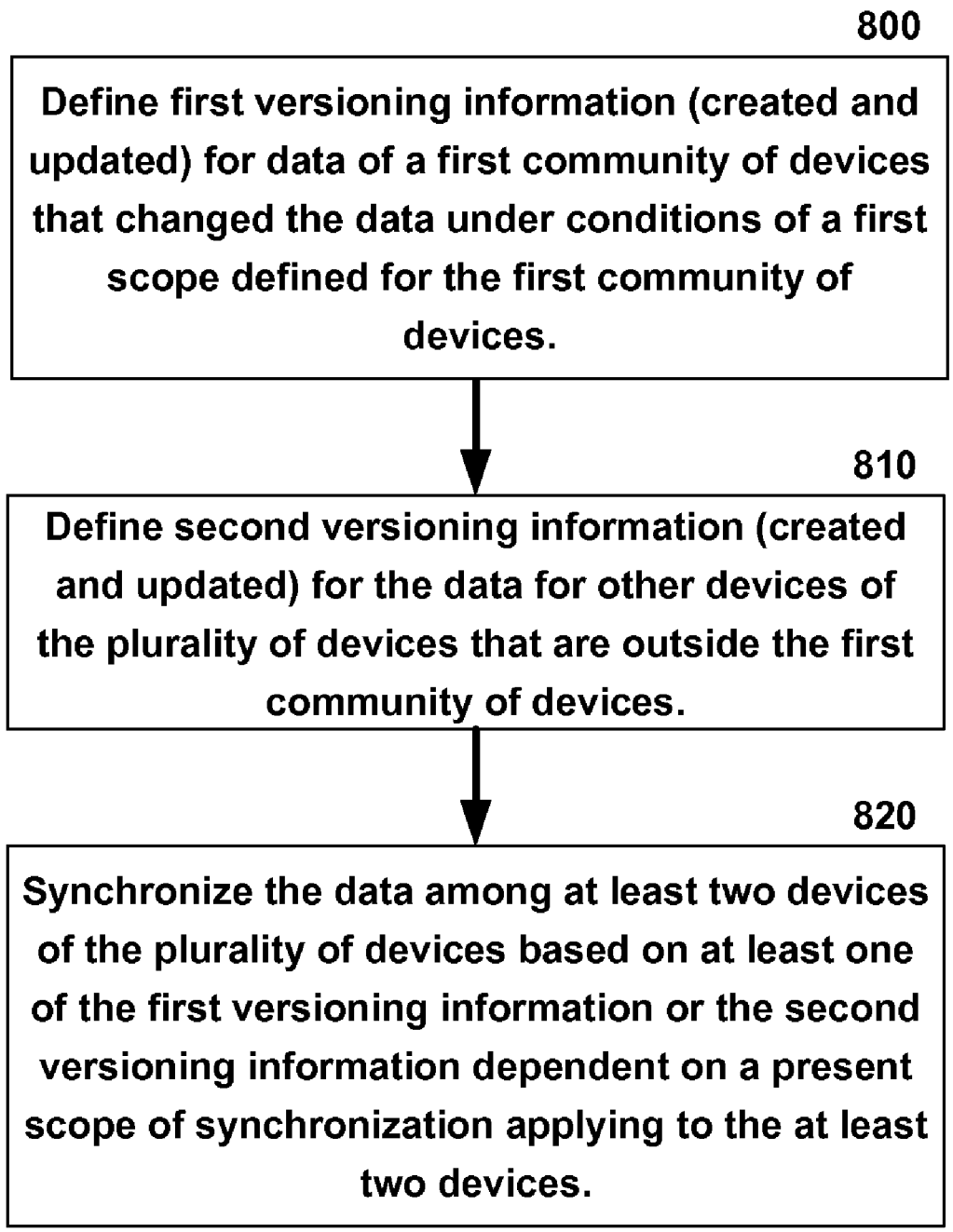
FIG. 8 is a flow diagram illustrating an exemplary non-limiting process for defining metadata for data items according to different scopes.

FIG. 8 is a flow diagram illustrating an exemplary non-limiting process for defining metadata for data items according to different scopes according to another embodiment. At 800, first versioning information (created and updated) is defined for data of a first community of devices that changed the data under conditions of a first scope defined for the first community of devices. At 810, second versioning information (created and updated) is defined for the data for other devices of the plurality of devices that are outside the first community of devices. At 830, the data is synchronized among two or more devices of the plurality of devices based on the first versioning information or the second versioning information depending on a present scope of synchronization applying to the two or more devices.

Figure 16:
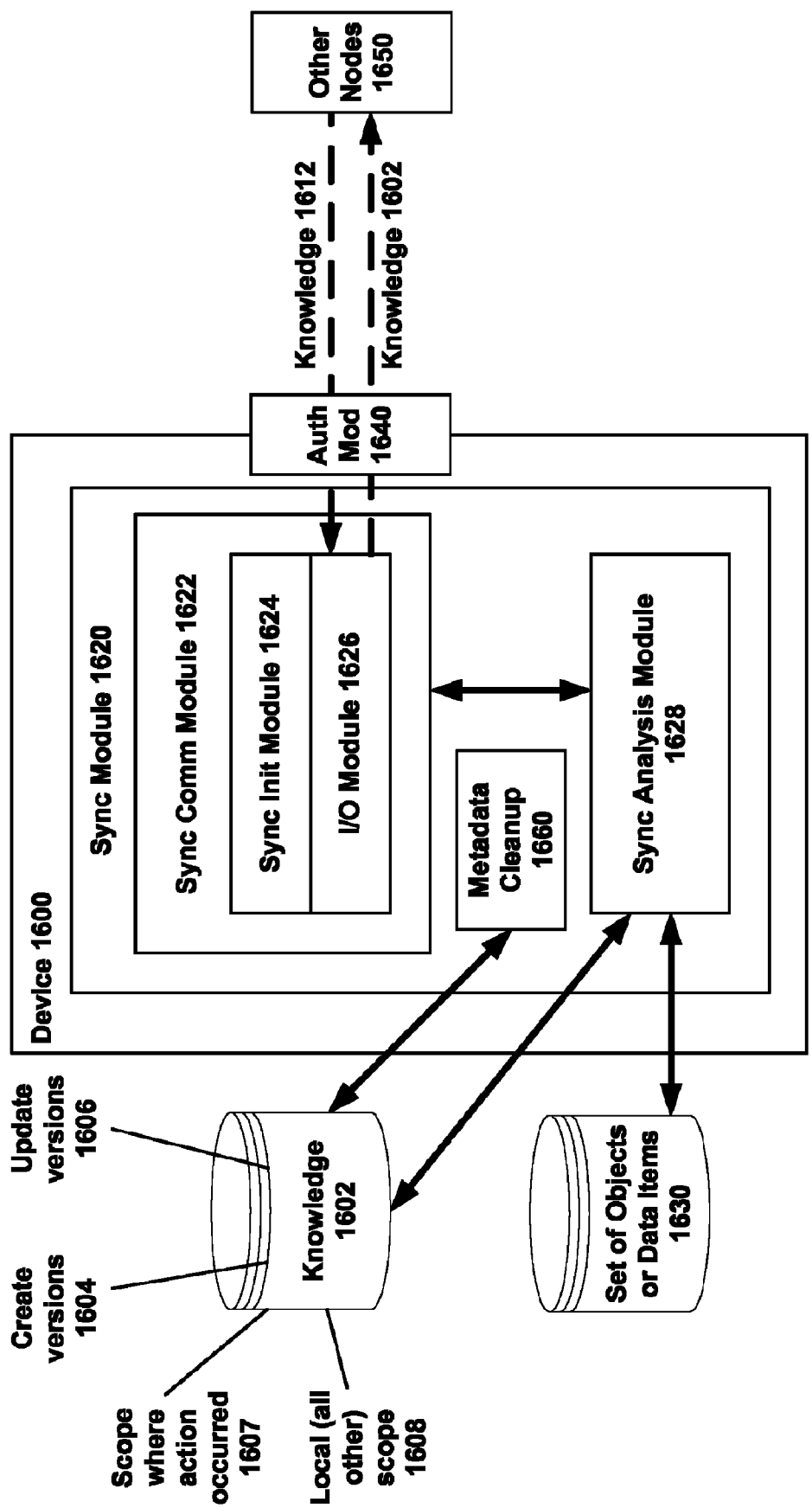
FIG. 16 is a block diagram of an exemplary non-limiting implementation of a device for performing a knowledge exchange in accordance with the invention.

FIG. 16 is a block diagram of an exemplary non-limiting implementation of a device 1600 for performing a knowledge exchange as described herein. As shown, device 1600 can include a sync module 1620 that performs the knowledge exchange techniques for synchronizing a set of objects 1630 with another device. Sync module 1620 may include a sync communications module 1622 for generally transmitting and receiving data in accordance with the knowledge exchange techniques of the invention.

Sync module 1620 may also include a sync initiation module 1624 which may initiate synchronization with a second device if authorized, e.g., via authorization module 1640, and connected to the second device. Sync module 1620 may also include an I/O module 1626 responsive to the initiation of synchronization by sending knowledge 1602 about the set of objects 1630 to the second device (not shown) and for receiving back knowledge 1612 of the second device and changes to be made to the set of objects 1630 originating from the second device. As described herein, knowledge 1602 can include create versions 1604 and update versions 1606 as well as scope version information 1607 concerning where the applicable action (create or update) occurred as well as local versioning information 1608 for use in connection with other scopes. In turn, a sync analysis module 1624 operates to apply the changes to be made to the set of objects 1630 and to compare knowledge 1612 from the second device with the knowledge 1602 of the first device 1600 in order to determine changes to send to the second device to complete synchronization between the devices.

The various embodiments described herein enable a synchronization framework and corresponding metadata tracking system where the number of versions used to represent an item in any number of scopes is bound to two. Without this efficient metadata, adding an item to a scope means adding another version to represent the item in that scope, which would increase as the number of scopes an item lives in increases, which would impact system performance and scalability. As the number of applications with large volumes of data that benefit from synchronization grow, a way to efficiently represent synchronization metadata across differing synchronization scopes will be useful to consumers of such a system.

In one embodiment, the solution can also include automation tools that allow this metadata tracking technique to easily be applied to a SQL Server database, i.e., by abstracting the details of how this metadata is stored and updated in a SQL database away from the specification of applicable scopes. The various embodiments can also include a way to restore a database from backup and update its metadata after restore such that synchronization can continue correctly and the correct versions are maintained.

Efficient Knowledge Representation and Exchange

In this section, an overview is presented of a general mechanism for efficiently representing knowledge in data synchronization systems in a multi-master synchronization environment in accordance with various non-limiting embodiments, to show how the two versions for CREATE/UPDATE for data items, as described above, are synchronized within a larger synchronization framework that synchronizes without regard to application specific details or data types.

The general mechanism includes (1) an efficient exchange of knowledge between connected devices by requiring only the minimum data used by a first node from a second node to be sent, (2) the ability to efficiently and correctly recognize disagreements over the state of data, e.g., conflicts, between a first node and a second node, (3) the ability to synchronize an arbitrary number of nodes and (4) the ability to synchronize any node via any other node, e.g., the ability to work in a peer to peer, multi-master synchronization environment.

With the general mechanism, any number of changes can be made to some information that is to be shared between the two devices. At any time they become connected, by exchanging their knowledge with one another, they become aware of at least the minimum amount of information used to reconstruct what each other knows and doesn't know to facilitate of changes between the devices. It is noted that where more than two devices are involved, knowledge may be incomplete knowledge of a greater base of information to be shared, but as more knowledge is shared around the multiple devices, collective knowledge continues to be accrued by the devices as they connect to the other devices over time.

Advantageously, in various non-limiting embodiments, the invention operates to perform synchronization for a set of devices, or, as described below, a subset of devices, any interested in maintaining the latest versions of a set of objects, but also allows such devices to come into connection and out of connection with the other objects of the set. Whenever a device comes back into connection with other device(s) of the set of devices via one or more networks, the device regains collective knowledge that is as up to date as the other device(s) represent with their collective knowledge. In this fashion, even loosely connected devices may come into and out of contact with a set of devices, and then relearn the knowledge missed by coming into contact with any set of devices that possess the latest set of collective knowledge.

Figure 9:
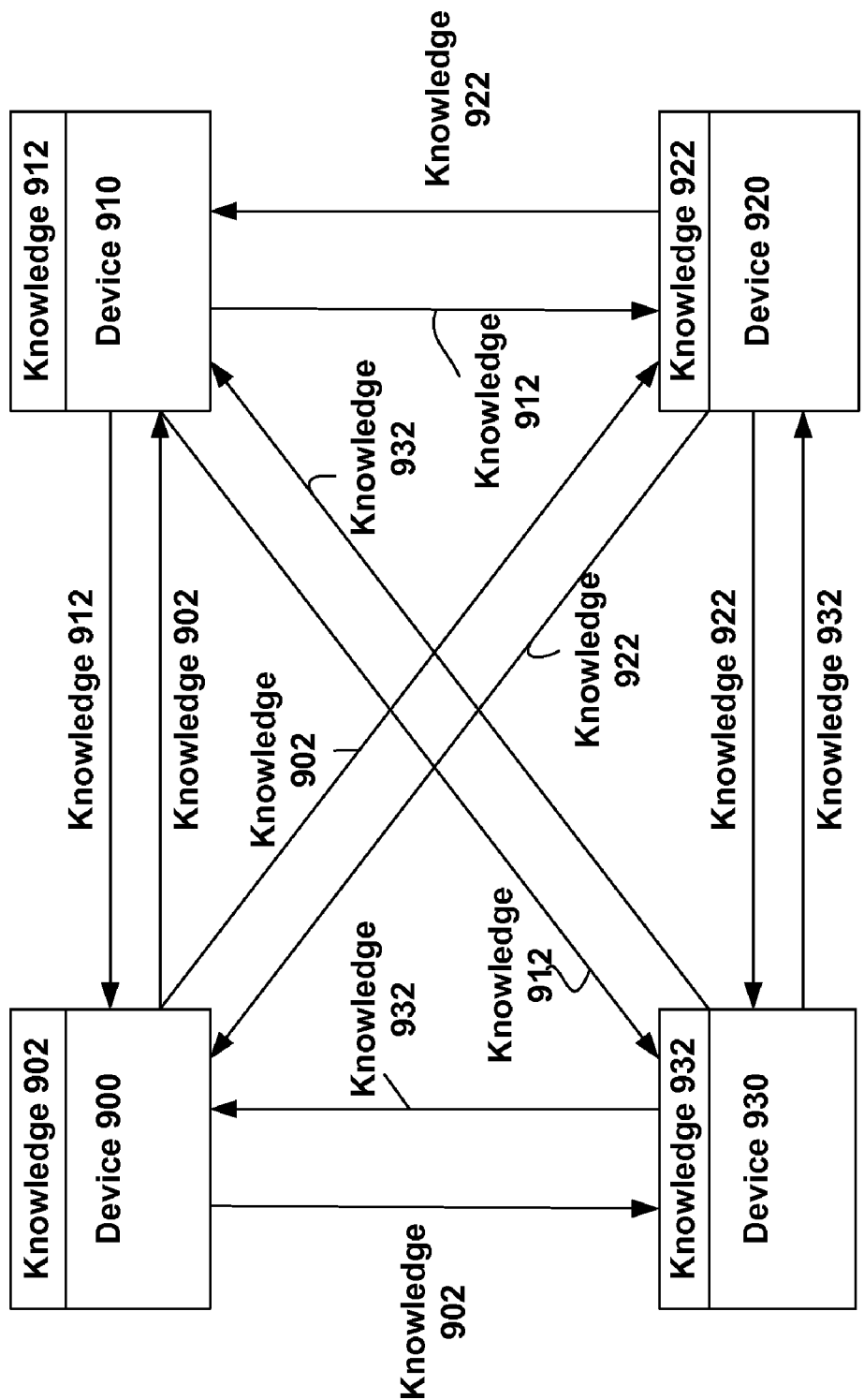
FIG. 9 illustrates exemplary non-limiting knowledge exchange between four nodes of a loosely connected network of nodes in accordance with the invention.

FIG. 9 illustrates that knowledge exchanges are generalizable, or scalable, to any number of devices. As shown, four devices 900, 910, 920 and 930 are shown with knowledge representations 902, 912, 922 and 932 that respectively indicate what each device knows and doesn't know about a set of common information to be shared across the devices.

Figure 10:
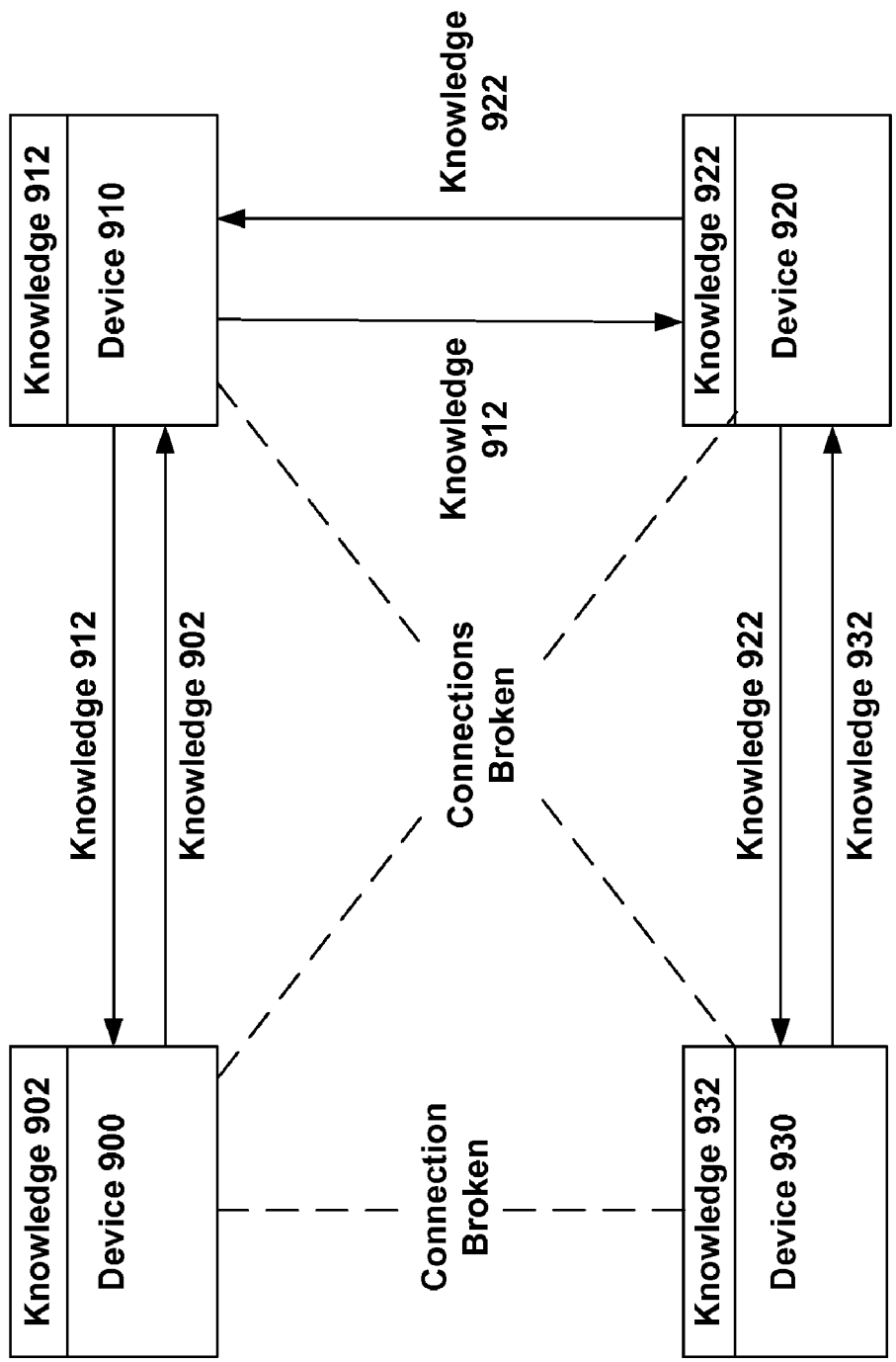
FIG. 10 illustrates exemplary non-limiting knowledge exchange between four nodes of a loosely connected network of nodes in accordance with the invention when some of the devices become disconnected from one another.

Advantageously, as shown by FIG. 10, even where connections in the network become disconnected, a complete set of knowledge can nonetheless be gained by the devices 900, 910, 920, and 930, as long as at least one connection directly or indirectly exists to the other devices. For instance, as shown, knowledge 932 of device 930 still reaches device 900 via the knowledge exchange with device 920, then via the knowledge exchange between device 920 and 910, and finally via the knowledge exchange between device 910 and 900.

With more devices sharing knowledge about common information to be shared, the devices benefit because knowledge exchange(s) in accordance with various non-limiting embodiments of the invention of the invention are agnostic about from which device collective knowledge comes. The devices each independently operate to try to gain as much knowledge about information to be shared among the devices from any of the other devices to which it is connected.

In exemplary non-limiting detail, a method is described in further detail for two nodes to engage in a conversation and at the end of the conversation to have equivalent knowledge for the concerned data set. The method is scalable beyond two nodes by creating a knowledge exchange capability for each new device entering the peer-to-peer network.

Figure 11:
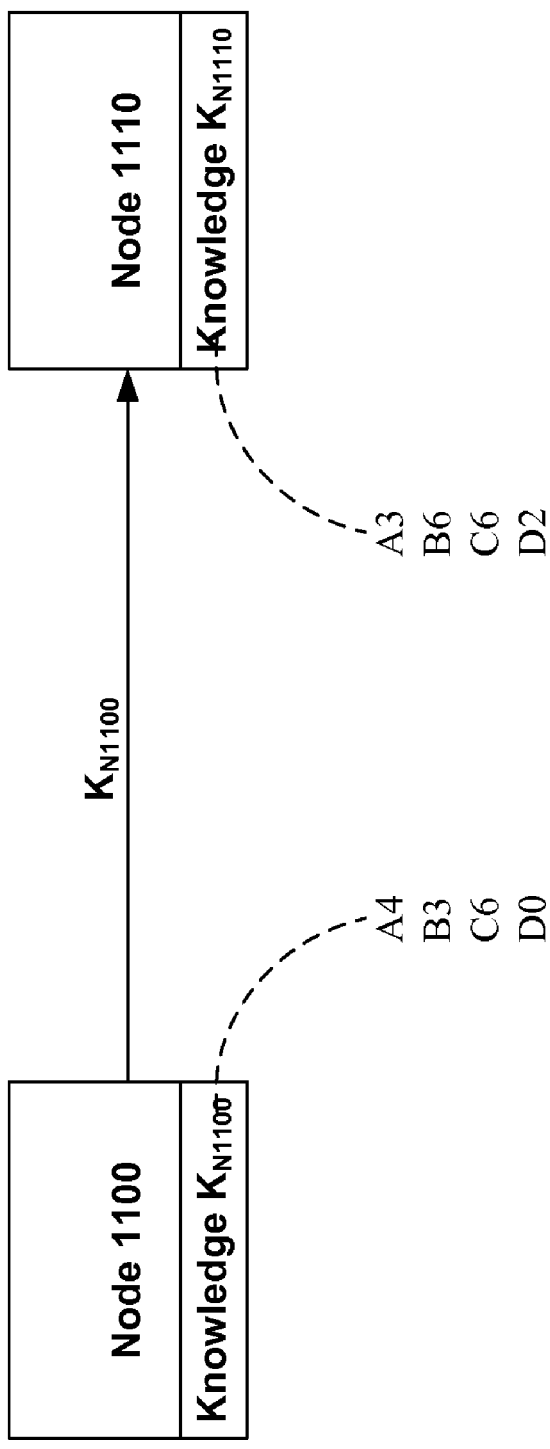
FIGS. 11, 12 and 13 illustrate exemplary knowledge exchange in the context of multiple objects shared among nodes of a network in accordance with the invention.

Thus, as shown in FIG. 11, node 1100 of a peer-to-peer network having any number of nodes wants to exchange data with Node 1110. Node A begins by requesting changes from Node 1110 and in order to do so Node 1100 sends its knowledge (represented as $K_{N1100}$) to Node 1110 as shown.

Knowledge of a device or node is represented by labeling each object to be shared among devices with a letter identifier, and then the trailing number represents the latest version for this object. For instance, $K_{N1100}$ as shown in FIG. 11 includes objects A, B, C and D each to be synchronized between nodes 1100 and 1110, and the number following each of the objects represents the latest version of the object known on the device. For instance, knowledge $K_{N1100}$ at a time t=1 includes the $5^{th}$ version of A, the $4^{th}$ version of B, the $7^{th}$ version of C, and the $1^{st}$ version of D, notated as A4, B3, C6, D0 in FIG. 11. In contrast, knowledge $K_{N1110}$ of node 1110 at a time t=1 may include the $4^{th}$ version of A, the $7^{th}$ version of B, the $7^{th}$ version of C, and the $3^{rd}$ version of D, notated as A3, B6, C6, D2 in FIG. 11.

Figure 12:
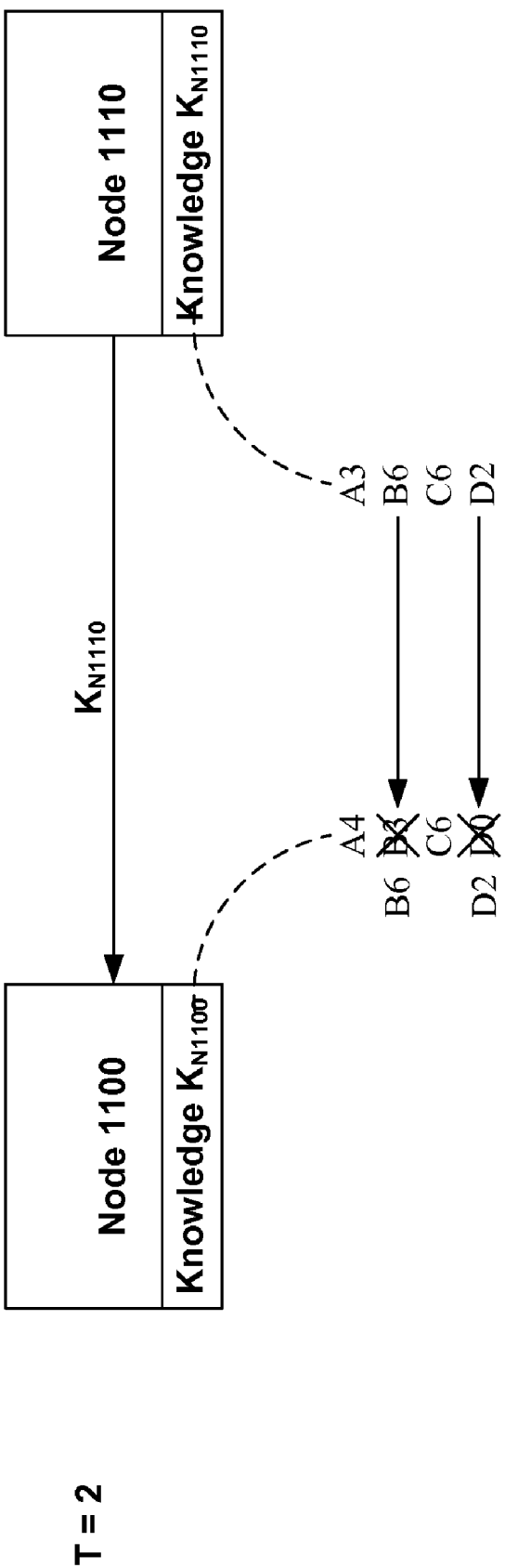

As shown in FIG. 12, at time T=2, node 1110 compares knowledge $K_{N1100}$ received from node 1100 against its own knowledge $K_{N1110}$ and determines what is to be sent to node 1100. In this example, as a result, node 1110 will send node 1100 the changes relating to B and D since node 1100's knowledge of B3, D0 is behind node 1110's knowledge of B6 and D2. When node 1110 sends node 1100 the changes between B6 and B3, and the changes between D2 and D0, it also sends along the latest version of knowledge $K_{N1110}$ it has (reflecting whenever the last change on node 1110 was made).

Figure 13:
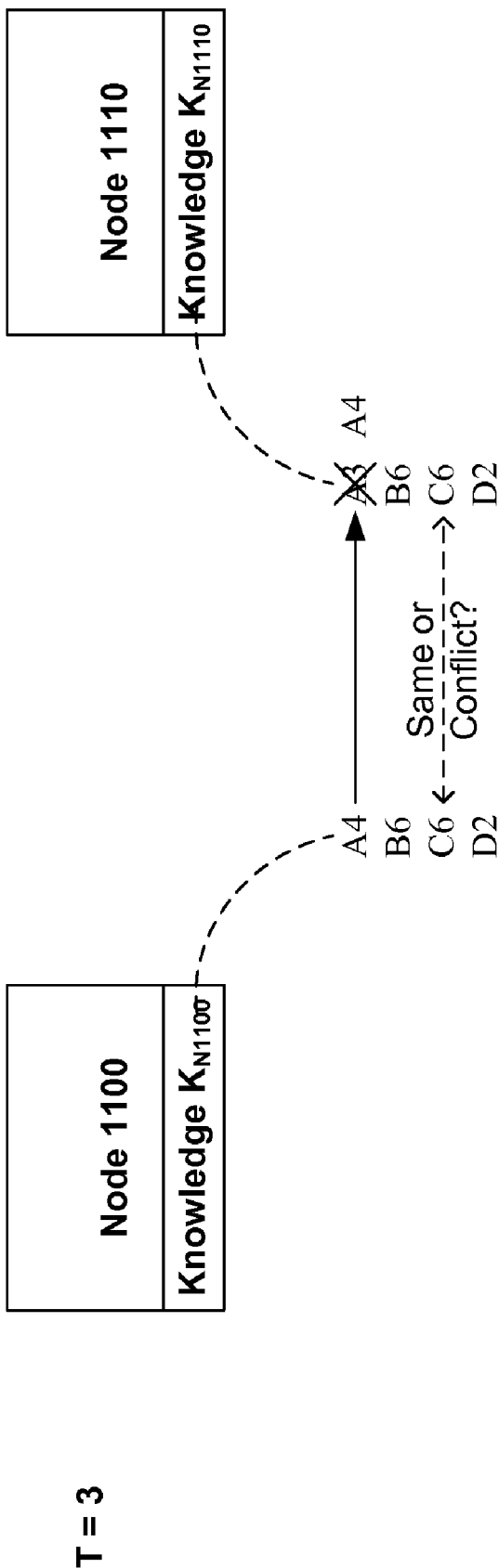

As shown in FIG. 13, representing time t=3, sending knowledge $K_{N1110}$ to node 1100 allows node 1100 to detect conflicts (e.g., store them for later resolution) if it later finds out that both node 1100 and node 1110 made a change to an object while they were on the same version. This allows for autonomous updating, efficient enumeration, but also correct conflict detection when the nodes meet and exchange changes. For instance, in the example, if C6 is not the same object in both knowledge $K_{N1110}$ and $K_{N1110}$, e.g., if both independently evolved from C5 to C6, then which C6 is the correct C6 can be set aside for conflict resolution, e.g., according to pre-set policy resolution that befits the synchronization scenario and devices involved.

Figure 14:
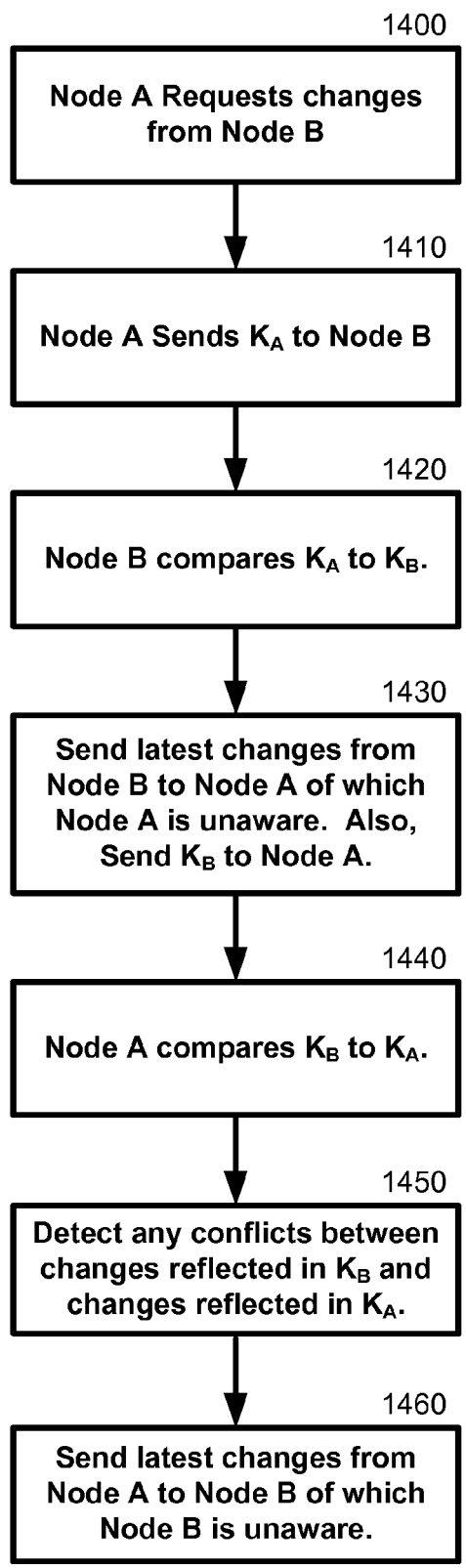
FIG. 14 is an exemplary non-limiting flow diagram illustrating the process for knowledge exchange in the context of multiple objects shared among nodes of a network in accordance with the invention.

An exemplary knowledge exchange process between any two nodes of a distributed multi-master synchronization environment using the above described general mechanism is shown in the flow diagram of FIG. 14. At 1400, node A requests synchronization with node B, thereby asking node B for changes node A does not know about. In order to equip node B, at 1410, node A sends its knowledge to node B. At 1420, node B compares the knowledge received from node A with its own knowledge to determine what changes node B knows about that can be sent to node A. At 1430, node B sends such changes to node A, and in addition, node B sends its knowledge to node A so that node A can perform a similar knowledge comparison at 1440.

At 1450, node A detects any potential conflicts between latest versions reflected in the knowledge of node B and latest versions reflected in the knowledge of node A, in the event that independent evolution of versions has occurred on node A and node B. Optionally, any conflict resolution policy may be applied to determine which node trumps the other node in the event of a conflict. At 1460, the latest changes from node A that are not possessed by node B are sent to node B. The conflict resolution policy will additionally dictate whether any changes are sent from node B to node A, or node A to node B, to maintain common information between the nodes. If independent versioning is OK, or desirable, no conflict resolution is another option.

Figure 15:
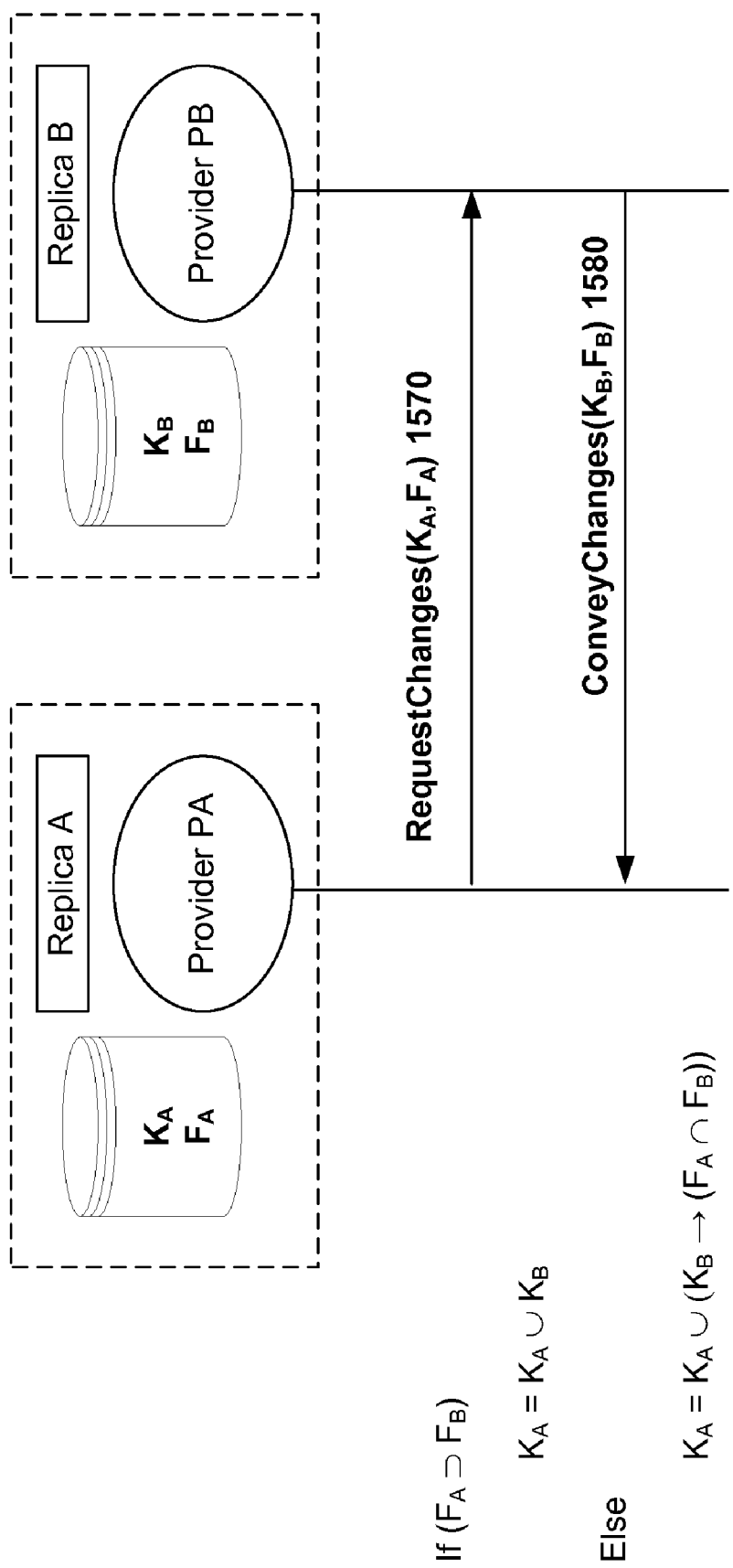
FIG. 15 is a general architecture illustrating the framework for requesting and conveying changes based on knowledge and partial knowledge in accordance with the invention.

FIG. 15 illustrates the generalized mechanism for exchanging knowledge when filtered knowledge is possible, i.e., where a subset of a node's knowledge is to be synchronized with one or more of the other nodes. As shown, each replica A and B has provider PA and provider PB, respectively. In this regard, each replica A and B maintains knowledge $K_A$ and $K_B$, respectively, and potentially also maintains filtered knowledge $F_A$ and $F_B$. Similar to the case with no subsetting, any of the replicas can request changes 1570 of another replica and receive changes 1580 in response to the other replica conveying changes. If the filtered knowledge $F_A$ and filtered knowledge $F_B$ are of the same scope, then as with the generalized knowledge exchange:

$$K_A = K_A \cup K_B$$

If the filtered knowledge $F_A$ and filtered knowledge $F_B$ are not of the same scope, then instead the knowledge is a function of existing knowledge plus the knowledge of the other replica as projected onto the intersection of their respective Filters $F_A$ and $F_B$, as follows:

$$K_A = K_A \cup (K_B \rightarrow (F_A \cup F_B))$$

Among other applications, an exemplary, non-limiting application for these types of filters is for filtering columns, or any change units of a synchronization framework. This is particularly applicable since column changes are not likely to be subject to move operations in the system. There are two considerations for this scenario worth noting: filter representation and knowledge consolidation.

With respect to filter representation, filter representation for the case of no move filters is as follows. Each filter is represented as a list of the change units contained within the filter. This representation provides a convenient means of representation as well as the ability to combine filters when necessary. The ability to combine filters is useful for consolidating knowledge.

With respect to knowledge consolidation, in order to keep knowledge in its most concise form the ability to consolidate knowledge must be maintained. In this regard, fragments of filtered knowledge can be consolidated so that knowledge can be maintained in its most compact form.

Considering the ability to combine filters, since filters can be represented as a set of change units, overlaps in filters can be reconciled by isolating the sets of change units that exist in both filters.

Also, since the vector for a filter applies to each of the individual change units within the filter, the combination of the filters can be performed by finding the combined vector for the change unit for each change unit in both filters. Then once the vectors are known, the change units that have a common vector are recombined into a new filter.

Accordingly, the notion of knowledge can be used to efficiently represent data for knowledge exchanges among multiple nodes of a multi-master synchronization network, any node of which may independently evolve common information, or subsets of common information, to be synchronized across the nodes. As described in more detail below, the above-described knowledge based framework is extendible to a multi-master synchronization environment including the two versions for create/update metadata as described herein for various embodiments.

Exemplary Networked and Distributed Environments

One of ordinary skill in the art can appreciate that the various embodiments of cross-scope synchronization and corresponding metadata described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may synchronize across different scopes as described for various embodiments of the subject disclosure.

Figure 17:
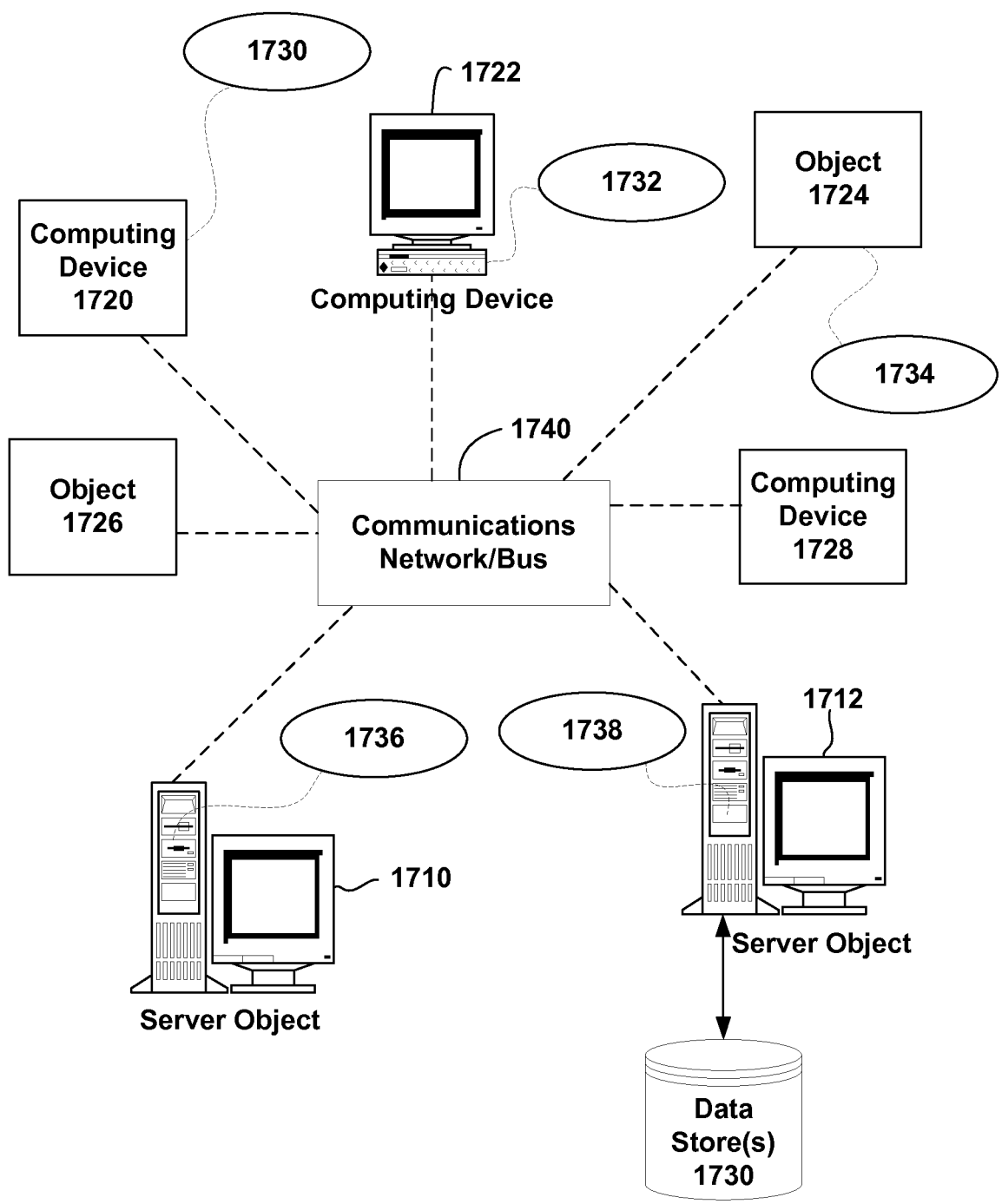
FIG. 17 is a block diagram representing exemplary non-limiting networked environments in which various embodiments described herein can be implemented.

FIG. 17 provides a schematic diagram of an exemplary networked or distributed computing environment. The distributed computing environment comprises computing objects 1710, 1712, etc. and computing objects or devices 1720, 1722, 1724, 1726, 1728, etc., which may include programs, methods, data stores, programmable logic, etc., as represented by applications 1730, 1732, 1734, 1736, 1738. It can be appreciated that objects 1710, 1712, etc. and computing objects or devices 1720, 1722, 1724, 1726, 1728, etc. may comprise different devices, such as PDAs, audio/video devices, mobile phones, MP3 players, personal computers, laptops, etc.

Each object 1710, 1712, etc. and computing objects or devices 1720, 1722, 1724, 1726, 1728, etc. can communicate with one or more other objects 1710, 1712, etc. and computing objects or devices 1720, 1722, 1724, 1726, 1728, etc. by way of the communications network 1740, either directly or indirectly. Even though illustrated as a single element in FIG. 17, network 1740 may comprise other computing objects and computing devices that provide services to the system of FIG. 17, and/or may represent multiple interconnected networks, which are not shown. Each object 1710, 1712, etc. or 1720, 1722, 1724, 1726, 1728, etc. can also contain an application, such as applications 1730, 1732, 1734, 1736, 1738, that might make use of an API, or other object, software, firmware and/or hardware, suitable for communication with or implementation of the cross-scope synchronization and corresponding metadata provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the cross-scope synchronization and corresponding metadata as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself In a client/server architecture, particularly a networked system, a client is usually a computer that accesses shared network resources provided by another computer, e.g., a server. In the illustration of FIG. 17, as a non-limiting example, computers 1720, 1722, 1724, 1726, 1728, etc. can be thought of as clients and computers 1710, 1712, etc. can be thought of as servers where servers 1710, 1712, etc. provide data services, such as receiving data from client computers 1720, 1722, 1724, 1726, 1728, etc., storing of data, processing of data, transmitting data to client computers 1720, 1722, 1724, 1726, 1728, etc., although any computer can be considered a client, a server, or both, depending on the circumstances. Any of these computing devices may be processing data, forming metadata, synchronizing data or requesting services or tasks that may implicate the cross-scope synchronization and corresponding metadata as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing cross-scope synchronization can be provided standalone, or distributed across multiple computing devices or objects.

In a network environment in which the communications network/bus 1740 is the Internet, for example, the servers 1710, 1712, etc. can be Web servers with which the clients 1720, 1722, 1724, 1726, 1728, etc. communicate via any of a number of known protocols, such as the hypertext transfer protocol (HTTP). Servers 1710, 1712, etc. may also serve as clients 1720, 1722, 1724, 1726, 1728, etc., as may be characteristic of a distributed computing environment.

Exemplary Computing Device

Figure 18:
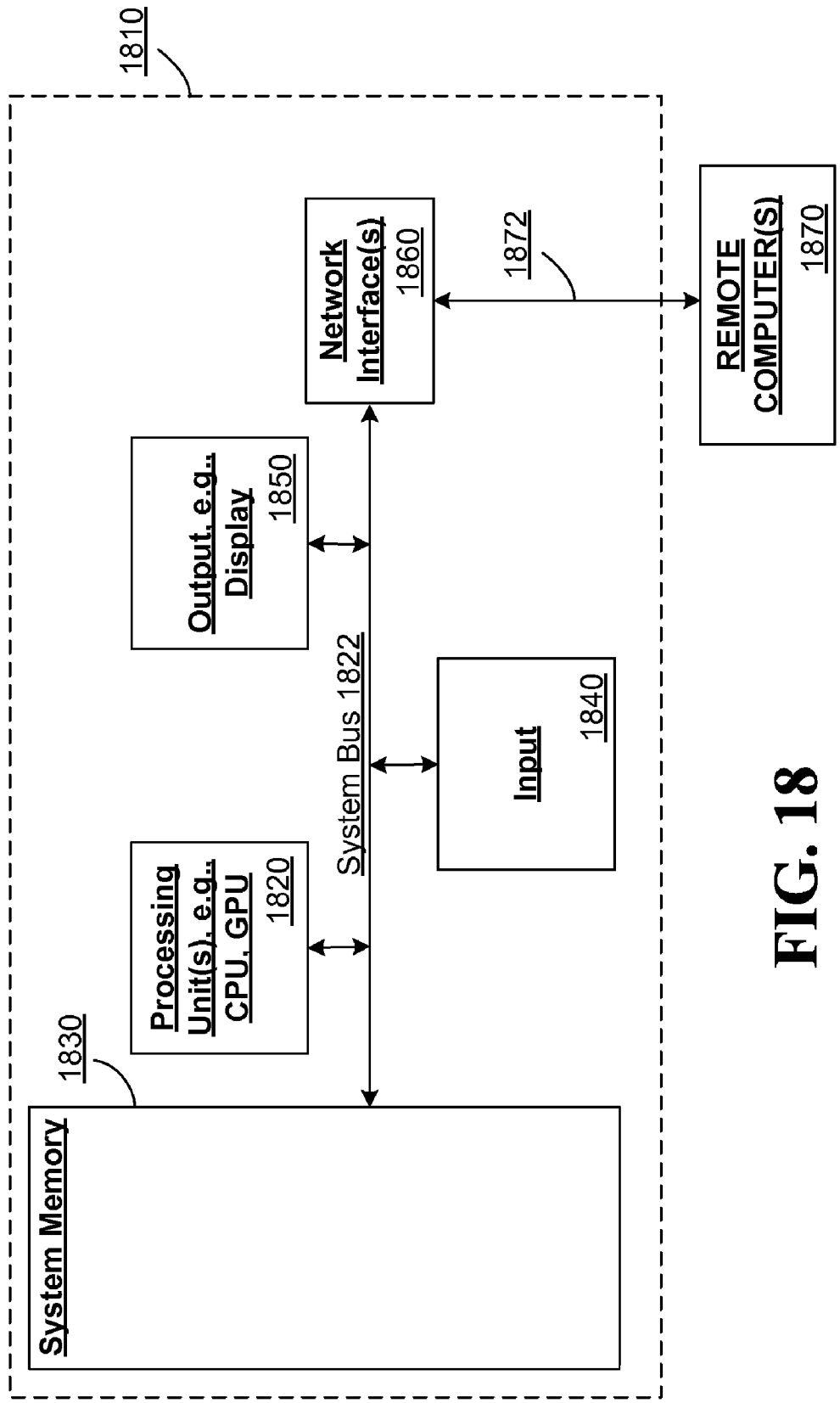
FIG. 18 is a block diagram representing an exemplary non-limiting computing system or operating environment in which one or more aspects of various embodiments described herein can be implemented.

As mentioned, advantageously, the techniques described herein can be applied to any device where it is desirable to perform cross-scope synchronization and maintain corresponding metadata. It should be understood, therefore, that handheld, portable and other computing devices and computing objects of all kinds are contemplated for use in connection with the various embodiments, i.e., anywhere that a device may wish to synchronize data. Accordingly, the below general purpose remote computer described below in FIG. 18 is but one example of a computing device. Additionally, cross-scope synchronization and corresponding metadata can include one or more aspects of the below general purpose computer, such as display or output of the data being synchronized via the display 1850.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

FIG. 18 thus illustrates an example of a suitable computing system environment 1800 in which one or aspects of the embodiments described herein can be implemented, although as made clear above, the computing system environment 1800 is only one example of a suitable computing environment and is not intended to suggest any limitation as to scope of use or functionality. Neither should the computing environment 1800 be interpreted as having any dependency or requirement relating to any one or combination of components illustrated in the exemplary operating environment 1800.

With reference to FIG. 18, an exemplary remote device for implementing one or more embodiments includes a general purpose computing device in the form of a computer 1810. Components of computer 1810 may include, but are not limited to, a processing unit 1820, a system memory 1830, and a system bus 1822 that couples various system components including the system memory to the processing unit 1820.

Computer 1810 typically includes a variety of computer readable media and can be any available media that can be accessed by computer 1810. The system memory 1830 may include computer storage media in the form of volatile and/or nonvolatile memory such as read only memory (ROM) and/or random access memory (RAM). By way of example, and not limitation, memory 1830 may also include an operating system, application programs, other program modules, and program data.

A user can enter commands and information into the computer 1810 through input devices 1840. A monitor or other type of display device is also connected to the system bus 1822 via an interface, such as output interface 1850. In addition to a monitor, computers can also include other peripheral output devices such as speakers and a printer, which may be connected through output interface 1850.

The computer 1810 may operate in a networked or distributed environment using logical connections to one or more other remote computers, such as remote computer 1870. The remote computer 1870 may be a personal computer, a server, a router, a network PC, a peer device or other common network node, or any other remote media consumption or transmission device, and may include any or all of the elements described above relative to the computer 1810. The logical connections depicted in FIG. 18 include a network 1872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to synchronize data across different synchronization scopes.

Also, there are multiple ways to implement the same or similar functionality, e.g., an appropriate API, tool kit, driver code, operating system, control, standalone or downloadable software object, etc. which enables applications and services to use the cross-scope synchronization and corresponding metadata. Thus, embodiments herein are contemplated from the standpoint of an API (or other software object), as well as from a software or hardware object that implements one or more aspects of the cross-scope synchronization described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A method, comprising:
synchronizing a set of objects between a node of a plurality of nodes and at least one other node of the plurality of nodes communicatively coupled via one or more networks, where at least two different synchronization scopes apply to at least two different nodes of the plurality of nodes, the node having at least one object of the set of objects shared across at least two different synchronization scopes, synchronizing the set of objects comprising:
using a processing unit, determining first versioning information of the node for the at least one object of the set of objects pertaining to a synchronization scope applicable to a set of nodes of the plurality of nodes where the at least one object at least one of changed or was created, and determining second versioning information of the node for the at least one object applicable to at least one synchronization scope of at least a second set of nodes other than the synchronization scope; and
using the processing unit, synchronizing the at least one object of the set of objects between the node and the at least one other node including determining whether to base the synchronizing on the first versioning information or the second versioning information depending upon a present scope of the synchronizing between the node and the at least one other node.

2. The method of claim 1, wherein the synchronizing includes synchronizing based on the first versioning information if the present scope of the synchronizing between the node and the at least one other node is the same as the synchronization scope applicable to the set of nodes where the at least one object at least one of changed or was created.

3. The method of claim 1, wherein the synchronizing includes synchronizing based on the second versioning information if the present scope of the synchronizing between the node and the at least one other node is different than the synchronization scope applicable to the set of nodes where the at least one object at least one of changed or was created.

4. The method of claim 1, wherein the synchronizing includes determining if the synchronization scope of the first versioning information represents that the at least one object at least one of was changed by, or was created on, the node.

5. The method of claim 4, wherein the synchronizing includes synchronizing based on the second versioning information if the determining yields that the at least one object at least one of was changed by, or was created on, the node.

6. The method of claim 4, wherein the determining includes determining if a synchronization scope identification of the first versioning information or second versioning information is none or null.

7. The method of claim 1, wherein each synchronization scope defines data to be synchronized and another node with which the data is to be synchronized.

8. A method for defining metadata for synchronizing among a plurality of devices and according to different synchronization scopes for different sets of devices of the plurality of devices, comprising:

for a device of the plurality of devices having data shared across the different synchronization scopes, synchronizing the data comprising:

defining first versioning information for the device for data of a first community of devices that changed the data under conditions of a first scope defined for the first community of devices;

defining second versioning information for the device for the data for other devices of the plurality of devices that are outside the first community of devices; and synchronizing the data among the device and another device of the plurality of devices based on at least one of the first versioning information or the second versioning information depending on a present scope of synchronization applying to the device and the another device.

9. The method of claim 8, wherein the defining of the first versioning information includes defining created versioning information for the data applicable to a created scope in which the data was created.

10. The method of claim 8, wherein the defining of the first versioning information includes defining updated versioning information for the data applicable to an updated scope in which the data was updated.

11. The method of claim 8, wherein the defining of the second versioning information includes defining created versioning information for the other devices.

12. The method of claim 8, wherein the defining of the second versioning information includes defining updated versioning information for the other devices.

13. A node connectable to a plurality of nodes via one or more networks and configured to synchronize a set of data items between the node and at least one other node of the plurality of nodes, comprising:

a synchronization component configured to synchronize the set of data items between the node and the at least one other node and configured to synchronize at least one data item of the set of data items according to at least two different synchronization scopes applying to at least two different groups of nodes of the plurality of nodes and encompassing the at least one data item, the synchronization component including:

a synchronization communications component configured to initiate synchronization with the at least one other node via a synchronization protocol that defines, independent of data type, metadata structure for a knowledge exchange between the at least one other node and the node, configured to transmit to the at least one other node a request to synchronize with the at least one data item within scope for the at least one other node based on the synchronization protocol and configured to receive external knowledge of the at least one data item within the scope for the at least one other node and corresponding versioning information from the at least one other node, wherein the metadata structure for the knowledge exchange includes versioning information for the scope for the at least one other node and versioning information for nodes outside the scope; and a synchronization analysis component configured to update local knowledge of the at least one data item represented on the node and corresponding node versioning information by comparing the external knowledge of the at least one data item and the corresponding versioning information from the at least one other node with the local knowledge of the at least one data item and the corresponding node versioning information to determine what changes to reflect in revised local knowledge of the at least one data item and the corresponding node versioning information.

14. The node of claim 13, wherein the metadata structure for the knowledge exchange includes created versioning information for a created scope in which the at least one data item was created.

15. The node of claim 14, wherein the created versioning information includes a created node version corresponding to a creating node that created the at least one data item in the created scope.

16. The node of claim 14, wherein the created versioning information includes a local node version based on a created node version corresponding to a creating node that created the at least one data item in the created scope and applicable to nodes of the plurality of nodes outside the created scope.

17. The node of claim 13, wherein the metadata structure for the knowledge exchange includes updated versioning information for an updated scope in which the at least one data item was most recently updated.

18. The node of claim 17, wherein the updated versioning information includes an updated node version corresponding to an updating node that updated the at least one data item in the updated scope.

19. The node of claim 17, wherein the updated versioning information includes a local node version based on an updated node version corresponding to an updating node that updated the at least one data item in the updated scope and applicable to nodes of the plurality of nodes outside the updated scope.

20. The node of claim 13, wherein the synchronization analysis component is further configured to analyze the external knowledge of the data items and the corresponding versioning information from the at least one other node with the local knowledge of the data items and the corresponding node versioning information to determine what second changes to send to additional nodes of the plurality of nodes about which the additional nodes do not know.

21. The node of claim 13, further comprising a metadata management component configured to at least one of tombstone or delete the portions of the versioning information from the local knowledge.

22. The node of claim 13, wherein the synchronization protocol does not prescribe any schema of the actual data being synchronized between the node and the Web service node.

* * * * *